March 28, 1967 H. GRETZSCHEL ET AL 3,311,067
WHEELED VEHICLES FOR TRAVEL ON STREETS AND RAILWAYS
Filed Aug. 5, 1964 8 Sheets-Sheet 7
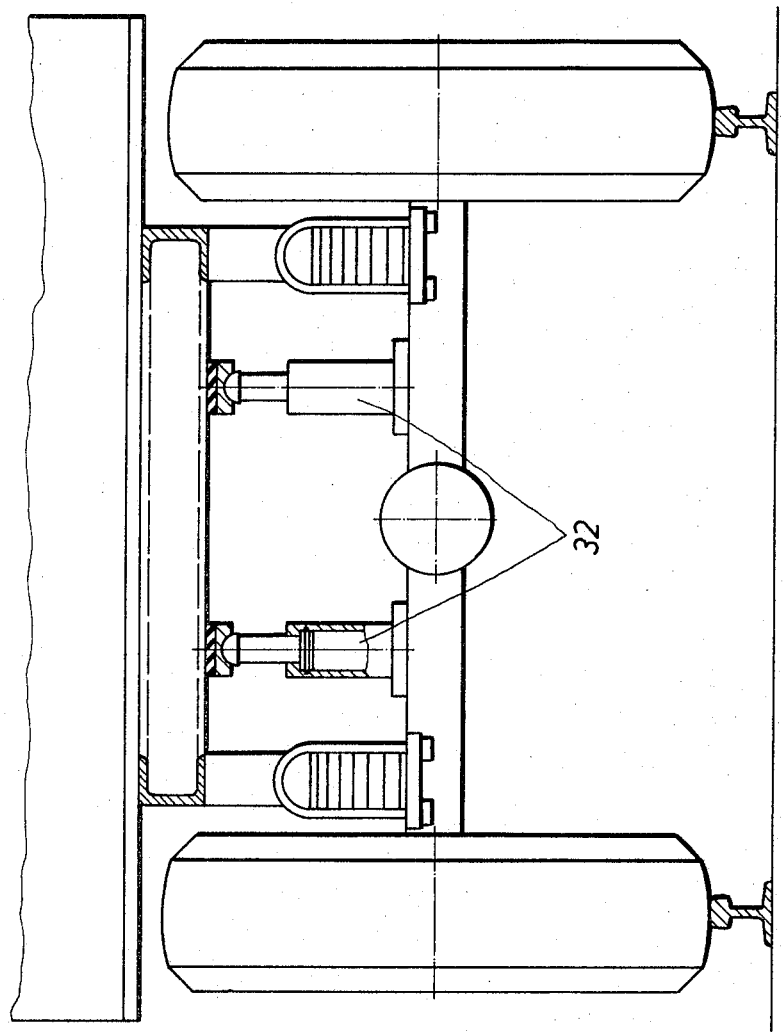
Inventors
Herbert Gretzschel
Theodor Schmauder
Hans-Peter Sinz

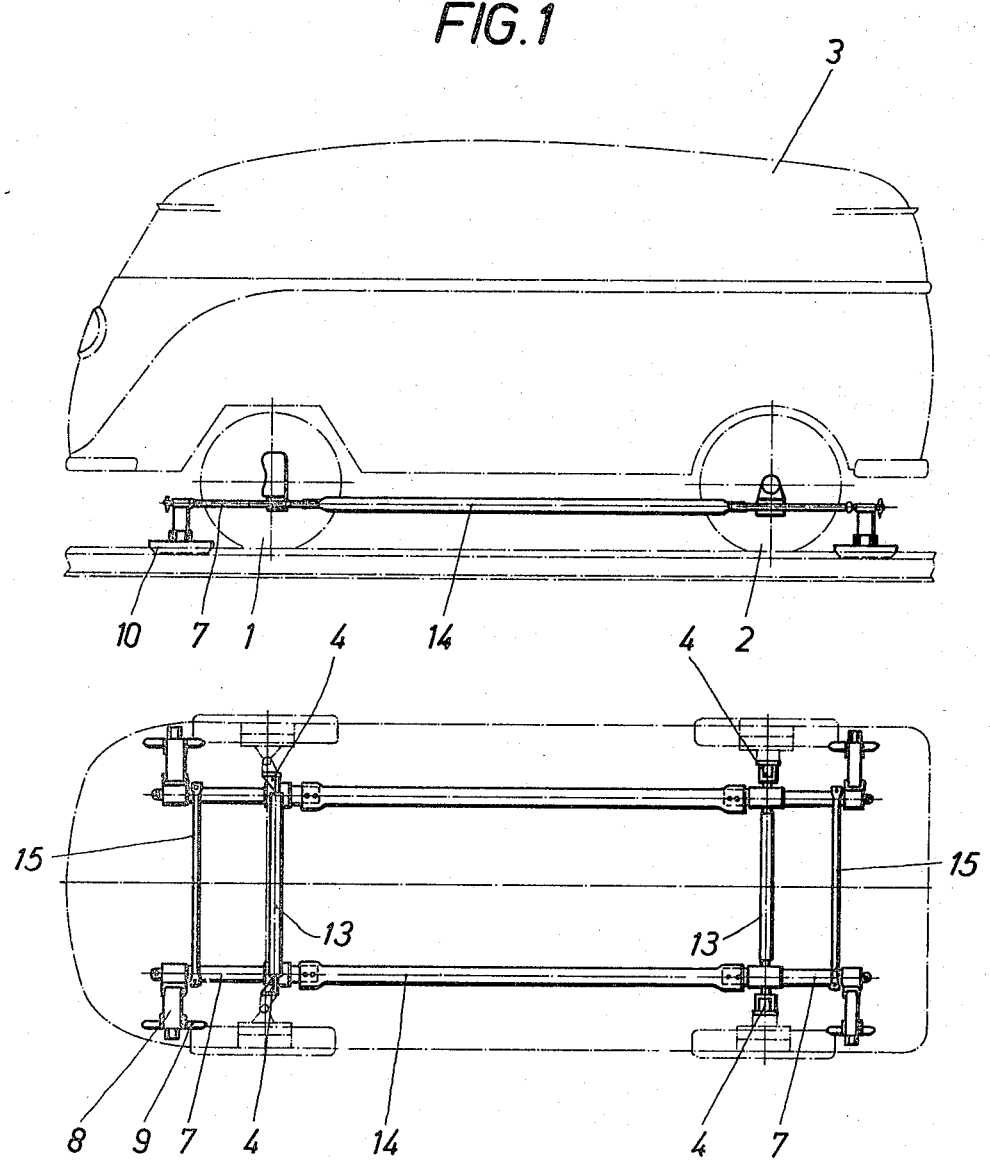

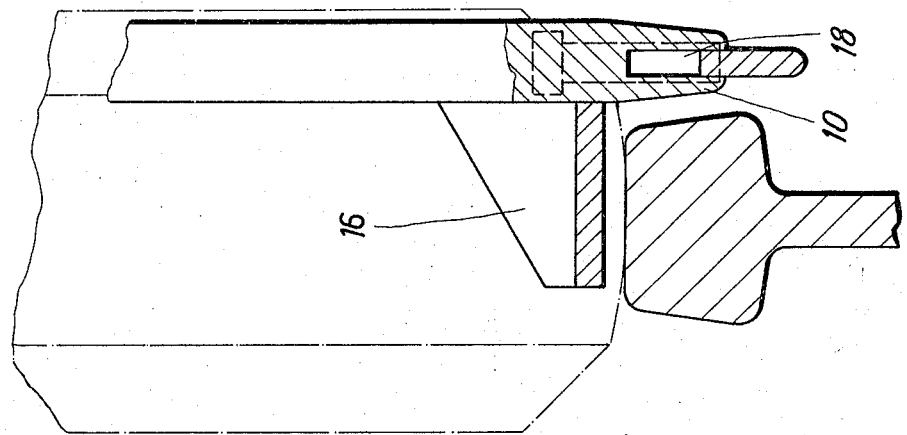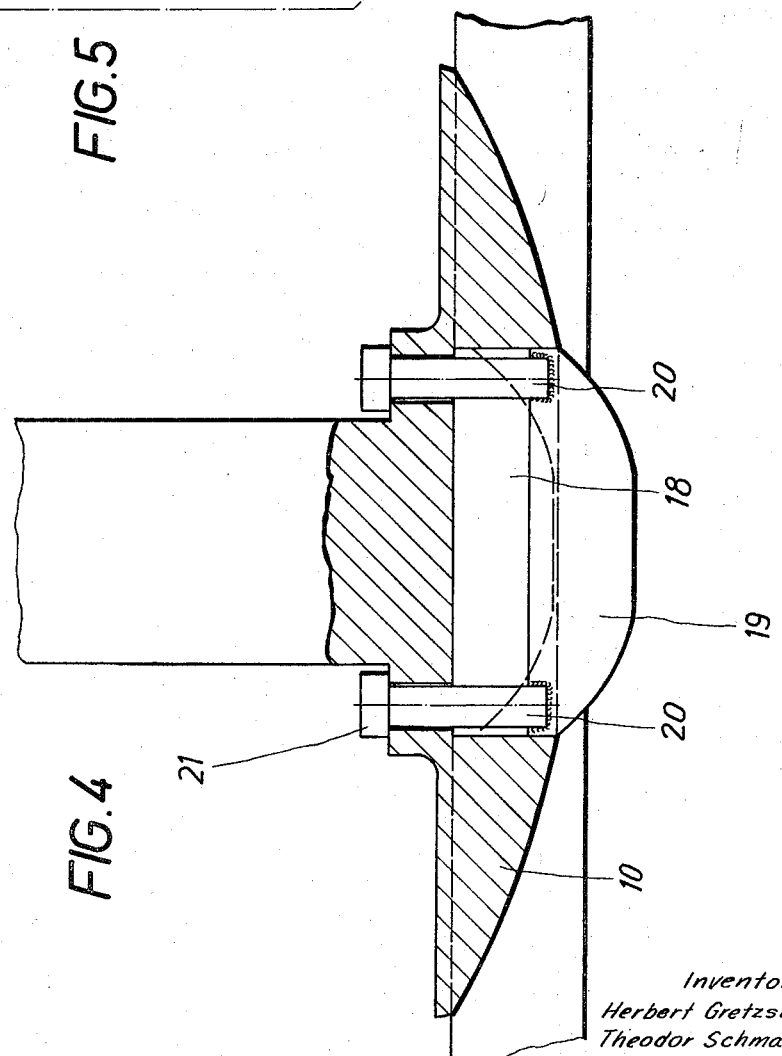

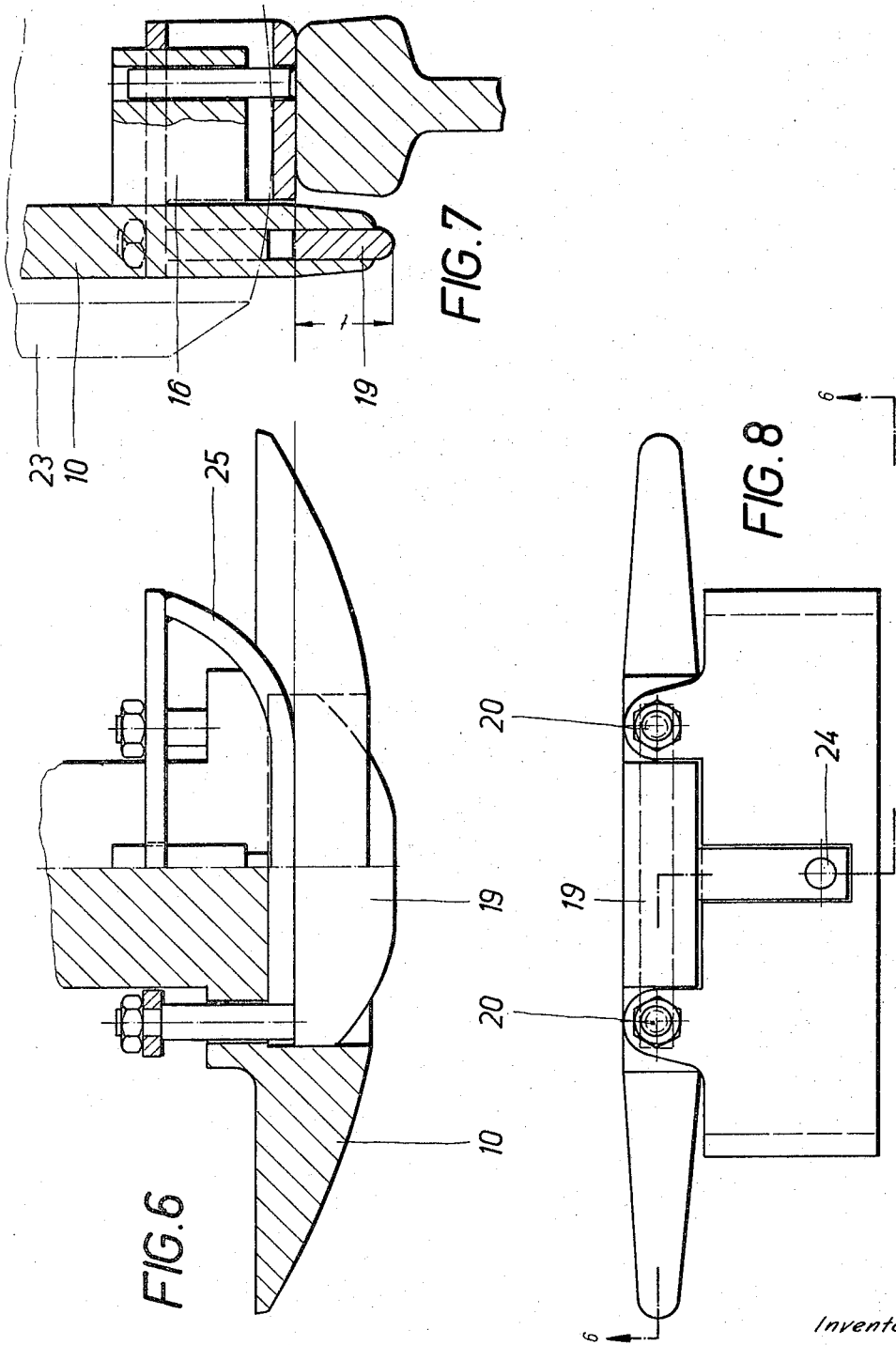

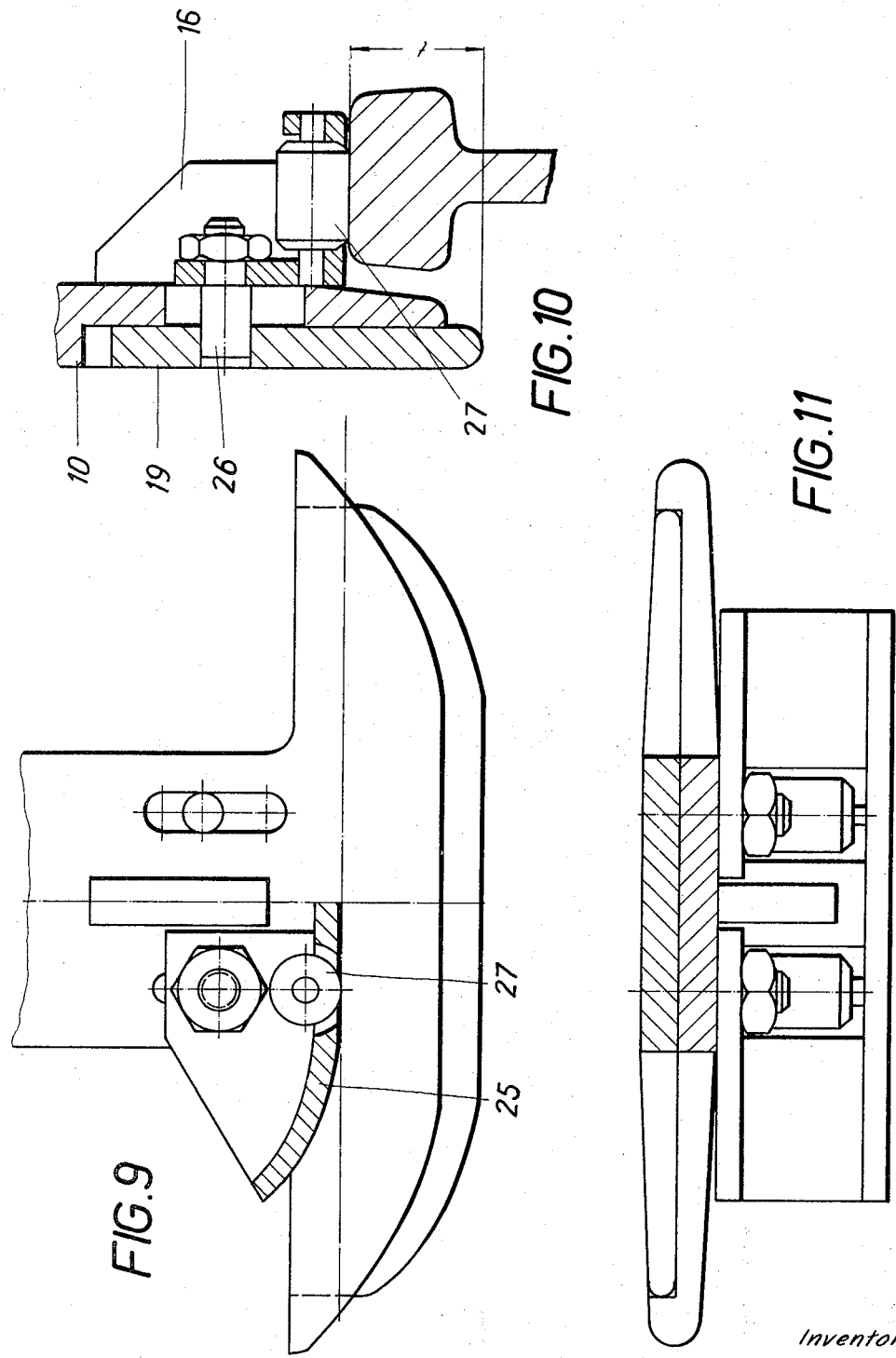

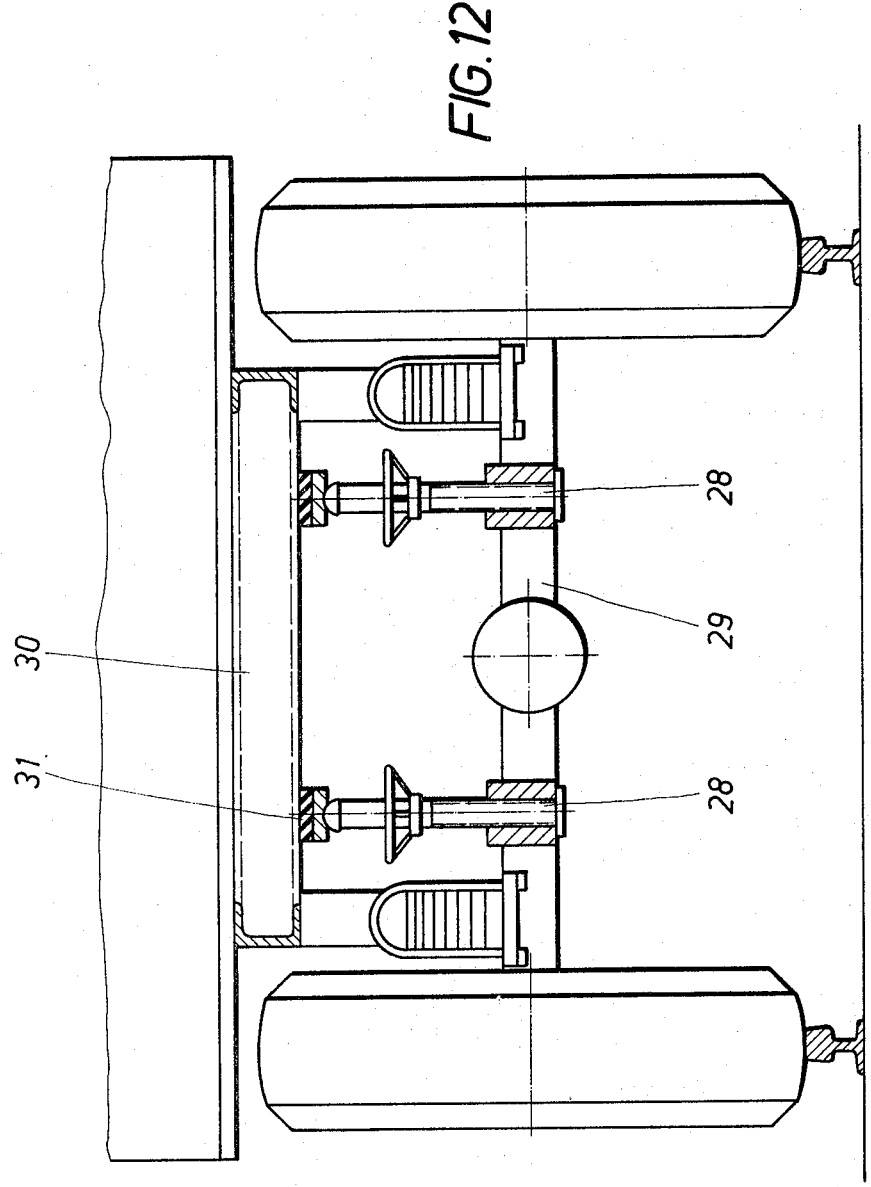

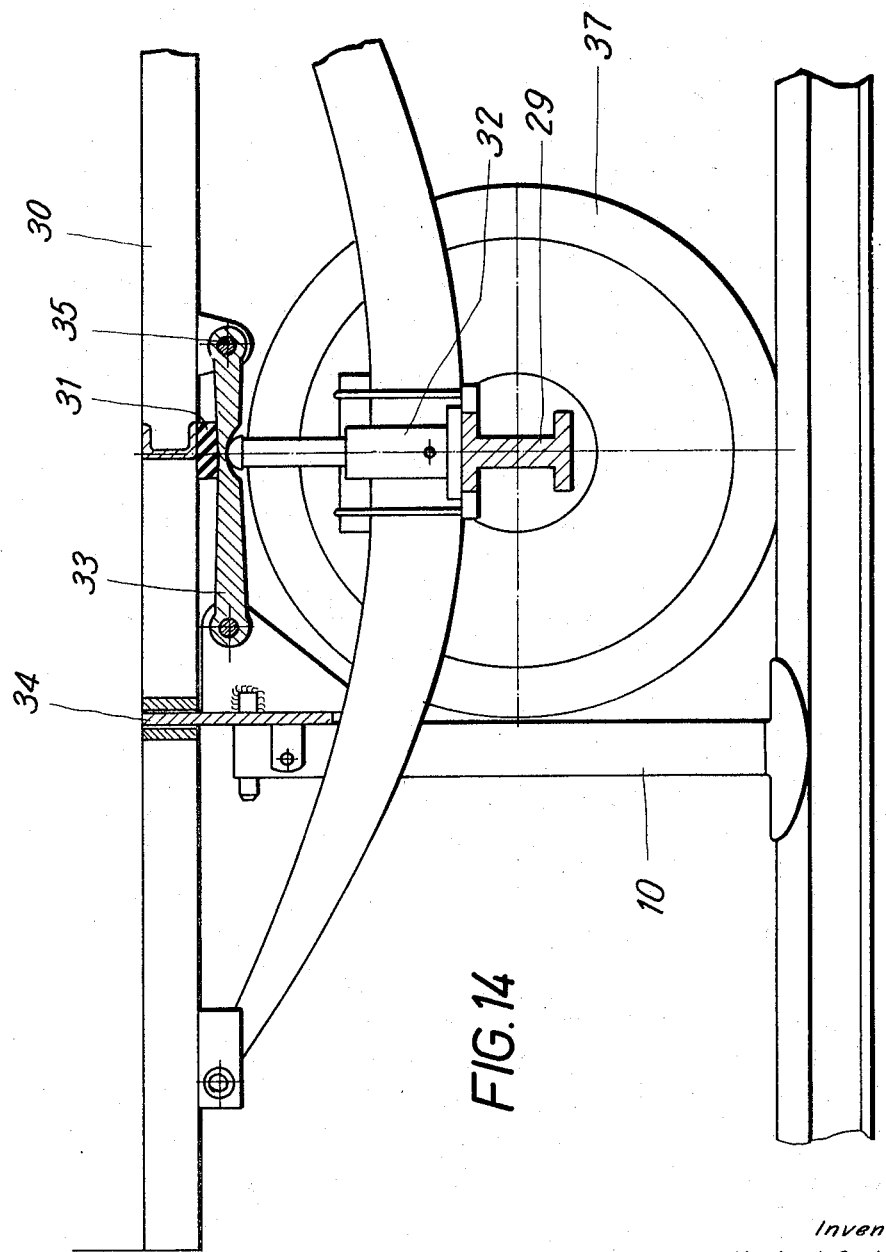

United States Patent Office 3,311,067
Patented Mar. 28, 1967

3,311,067
WHEELED VEHICLES FOR TRAVEL ON STREETS AND RAILWAYS
Herbert Gretzschel, Jahnstr. 30, Lochham, Germany; Theodor Schmauder, Kaiserblickstr. 10, Schlossberg, Germany; and Hans-Peter Sinz, Hauptstr. 1a, Witzhelden, Germany
Filed Aug. 5, 1964, Ser. No. 387,722
4 Claims. (Cl. 104—242)

The present invention relates to vehicles.

More particularly, the present invention relates to vehicles which are adapted to travel either on streets or on railways. Vehicles of this type are of considerable advantage because instead of requiring separate vehicle construction for traveling on streets and railways, the same vehicle construction can be used for both types of travel. Moreover, where railways cover certain types of terrain which could not be traveled by ground-engaging wheels, vehicles of this type can travel over such terrain on the railway and then where suitable streets are available the vehicles can leave the railway and travel on the normal streets.

It has already been proposed to solve this problem by providing a vehicle with interchangeable underframes one of which is suitable for use with rails and the other of which is suitable for use with streets, but this solution is undesirable not only because of the different underframes which are required but also because of the necessity of changing one frame for another. When changing such frames it is necessary to raise the vehicle body and remove one frame and replace it by another, so that considerable inconvenience is involved. There are also known vehicles which carry at the front and rear ends turnable assemblies which include wheels capable of traveling on rails so that these assemblies are turned down to operative position for rail travel and turned up to inoperative positions for street travel, and these assemblies are simply raised away from the street during travel on a street, while during travel on rails they are lowered sufficiently to place the rail wheels in engagement with the rails.

The above known solutions to this problem have, however, the principal disadvantage of requiring exceedingly complex structures of very great weight. Particularly with the latter type of construction including turnable front and rear assemblies the vehicle is loaded to such an extent by these assemblies that it is hardly possible to add any additional useful load to the vehicle.

It is accordingly a primary object of the present invention to provide a vehicle capable of traveling on streets or railways without, however, requiring complex heavy assemblies to accomplish this result.

In particular, it is an object of the invention to provide a structure where the same wheels will have rolling contact with a street or with railway rails, so that the requirements of providing different sets of wheels for the different types of travel is avoided. Thus, by the elimination of one complete set of wheels the weight required by the structure of the invention is considerably less than the conventional vehicles capable of traveling on streets and railways. This reduction in weight is achieved not only by the elimination of an extra set of wheels but also by the elimination of the additional structure which must necessarily be associated with such an extra set of wheels.

Also, it is an object of the invention to provide an exceedingly inexpensive and simple structure of low weight to enable a vehicle to travel on rails as well as on streets, so that the load-carrying capability of the vehicle remains substantially unchanged as compared to conventional vehicles.

A further object of the present invention is to provide a structure capable of reliably maintaining and guiding conventional rubber-tired vehicle wheels on railway rails even though the vehicle is subject to bumps and shocks and may not at all times have all of its wheels in engagement with the railways rails.

Furthermore, it is an object of the invention to provide a structure which can very easily be set to provide either travel of the vehicle on rails or travel of the vehicle on streets.

With the above objects in view, the invention includes, in a vehicle capable of traveling on rails or streets, a vehicle body and two pairs of rubber-tired vehicle wheels respectively situated at opposite sides of the vehicle body for supporting the body for travel on streets. The two pairs of wheels are spaced from each other by a distance equal to the distance between the rails of a railway so that the vehicle wheels can also ride on the rails of a railway, and in accordance with the invention a guide means is carried by the vehicle body and extends into the region normally occupied by the rims of conventional railway wheels so that the guide means will cooperate with the rails of a railway to guide and maintain the conventional rubber-tired wheels of the vehicle thereon.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a side elevation of one possible embodiment of a structure according to the invention shown cooperating with railway rails, the vehicle and rails of FIG. 1 being shown in phantom;

FIG. 2 is a plan view of the structure of FIG. 1;

FIG. 4 is a fragmentary partly sectional side elevation of one possible embodiment of a guide means for guiding a vehicle wheel on a railway rail;

FIG. 5 is a transverse sectional elevation of the structure of FIG. 4;

FIG. 6 is a partly sectional side elevation of another embodiment of a guide means for guiding a vehicle wheel on a railroad rail, the section of FIG. 6 being taken along line 6—6 of FIG. 8 in the direction of the arrows;

FIG. 7 is a section transverse elevation of the structure of FIG. 6;

FIG. 8 is a top plan view of the structure of FIG. 6;

FIG. 9 is a partly sectional side elevation of another embodiment of a guide means of the invention;

FIG. 10 is a transverse sectional elevation of the structure of FIG. 9;

FIG. 11 is a partly sectional top plan view of the structure of FIG. 9;

FIG. 12 shows part of a structure for supporting the vehicle body during travel of the vehicle on railway rails;

FIG. 13 shows a different embodiment of a structure for supporting a vehicle body while the vehicle travels on railway rails;

FIG. 14 is a longitudinal partly sectional elevation showing how the structure of FIGS. 12 and 13 cooperates with a guide means for guiding the vehicle wheels on railway rails.

Figure 3:
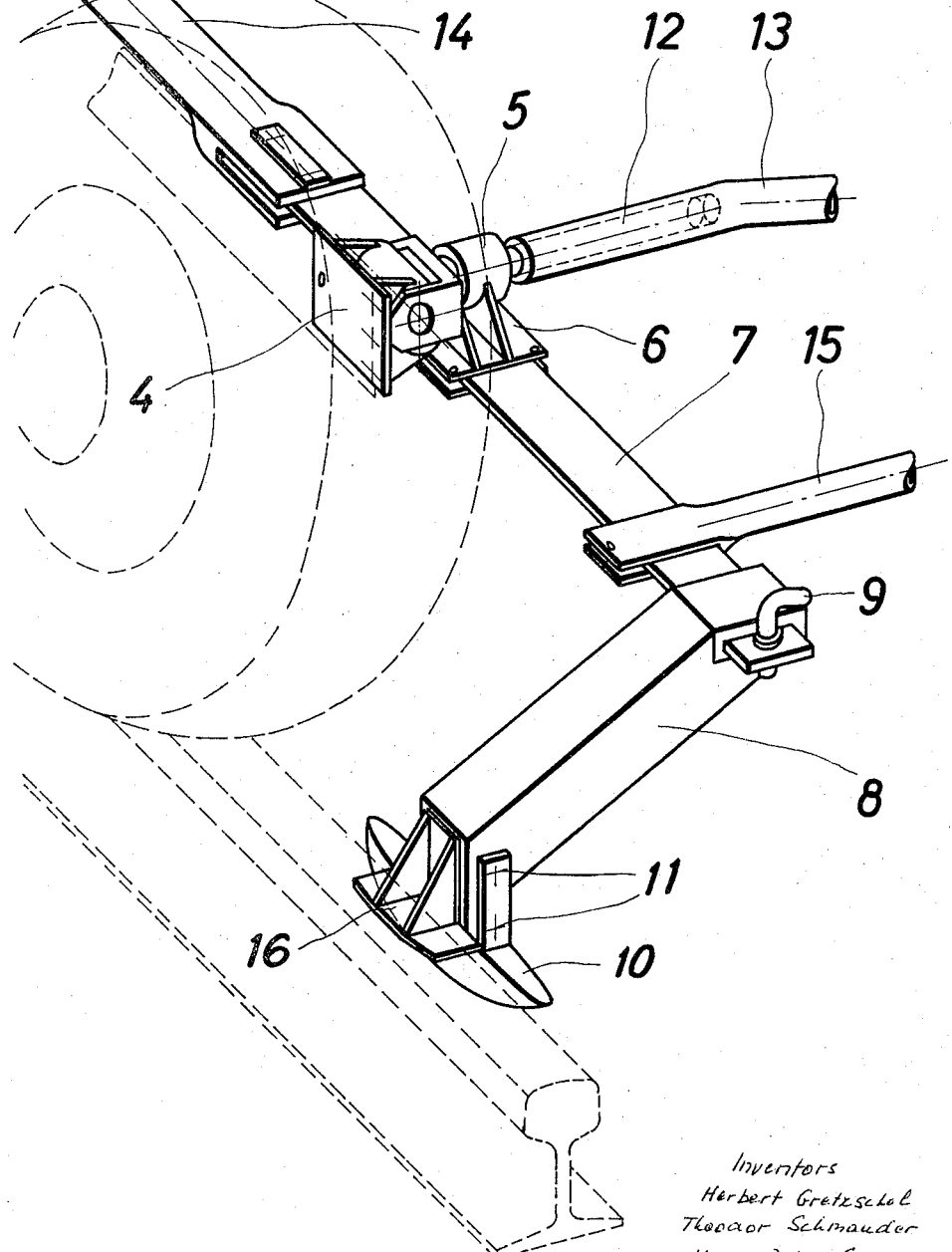
FIG. 3 is an enlarged perspective illustration of that part of the structures of FIGS. 1 and 2 which cooperates with one of the wheels, this structure of FIG. 3 being identical for each of the wheels.

Referring now to FIGS. 1–3, there is illustrated therein a vehicle having a vehicle body 3 and including pairs of wheels 1 and 2, the wheels 1 being the front wheels and the wheels 2 being the rear wheels of the vehicle. Bearing blocks 4, which form part of a frame means, are fixed to the suitable parts of the vehicle such as, for example, the steering knuckles or spring holders thereof. Spring support members 6 are fixed to the bearing blocks 4 with suitable blocks 5, for absorbing sound, interposed between and connected with the blocks 4 and 6 (FIG. 3).

Elongated springs 7 are fixedly carried by the members 6, and at their outermost ends the springs 7 carry arms 8, respectively, which extend downwardly from the springs 7 toward the railway rails. The arms 8 may respectively be formed with slots through which the springs 7 freely pass and suitable bolts 9 may be located in openings at the ends of the springs 7 for releasably retaining the arms 8 assembled therewith. Guides 10, described in greater detail below, are removably fixed to the free ends of the arms 8 by suitable removable screws 11.

Assuming that according to the type of vehicle it is possible to reliably fix the bearing blocks 4 to the vehicle, the structure described above may form the entire frame means for supporting the guide means 10. With relatively light vehicles an exceedingly stable mounting of the guide means 10 can be achieved by providing the spring holders 6 with pins 12 respectively received in bores at the ends of members 13 which extend over the wheel axles, and these pins 12 can move in a horizontal plane relative to the members 13. Also, the inner ends of the springs 7 are fixed to a pair of longitudinally extending substantially rigid tubes 14, these latter tubes having a length substantially equal to the distance between the front and rear axles, and in the region of their outer ends the springs 7 are fixed to a pair of transverse substantially rigid tubes 15, so that all of these elements form a frame means for connecting the guide means 10 to the vehicle body 3 while also interconnecting the several guide means 10 with each other, and it will be noted that the springs 7 are incapable of twisting but can move up or down and to a slight extent laterally. The upward movement of the spring 7 can be limited by suitable stops.

As is particularly apparent from FIG. 3, the guides 10 are located at the inner sides of the rails at only a slight distance therefrom, these guides extending into the space normally occupied by the rims of conventional railway wheels where such rims also engage the inner sides of the rails. Moreover, the configuration of the guides 10 is such that they generally conform to the configuration of that part of a railway wheel which is situated in the immediate vicinity of the rail. Each guide means 10 has substantially pointed front and rear ends and they also taper downwardly so as to have a minimum thickness at their bottom ends. Moreover, the arms 8, fixedly carry at their outer ends supporting members 16 normally spaced above the rails but capable of sinking down to and engaging the rails if too much air escapes from the conventional vehicle wheels, so that the elements 16 limit the extent to which the vehicle will move downwardly when traveling on rails.

The manner in which the guide means is connected to the vehicle, according to the invention, is not limited to the examples described above and shown in the drawings. For example, it is possible in accordance with the invention, to provide guide means in the region where the vehicle wheels turn for executing steering movements, and in fact the guide means may be connected directly to the steering mechanism, so that the vehicle wheels can be turned by engagement of the guide means with the rails. Such a result may be achieved by connecting the blocks 4 not to a stationary part of the vehicle or wheel supporting structure but rather to a moveable part which turns when the wheel travels along a curve, the blocks 4 being connected to the steering knuckles, for example. Furthermore, the guides 10 need not be situated ahead of the front wheels and behind the rear wheels. They can also be situated behind the front wheels or in front of the rear wheels. Furthermore, the arms 8 can be turnably connected to the springs 7 by providing a suitable pivotal connection at the ends of the springs 7 connecting the arms 8 thereto, so that the arms 8 can simply be swung relative to the springs 7, and it becomes unnecessary to remove them after removing the bolts 9.

In addition, structure can be provided for reducing the friction between guides 10 and the rails. For example small rollers can be arranged to engage and roll with respect to the rails, particularly with respect to the upper surface of the rails.

Referring now to FIGS. 4 and 5, it will be seen that the guide 10 is formed with a slot 18 which is open at its bottom end and which receives an auxiliary guide member 19 which together with the main guide member 10 forms the entire guide means. A pair of pins 20 are fixed to the auxiliary guide means 19 and extend through vertical bores of the main guide means 10 so that the auxiliary guide means 19 is freely movable vertically within the slot 18 and the pins 20 have enlarged head ends 21 to engage the upper surface of the main guide means 10 for limiting the downward movement of the auxiliary guide means 19. Normally the auxiliary guide means 19 will be in the position shown in FIG. 4, which is its lowest position relative to the main guide means 10. However, if the guide means 19 should encounter an obstruction it will simply move up into the slot 18 while riding over such an obstruction. The elongated slender configuration of the auxiliary guide means 19 together with its curved front and rear ends enables it to ride over obstructions encountered during travel of the guide means along a rail. The support 16 for limiting the downward movement of the vehicle body relative to the rail, as described above, is directly fixed to the main guide means 10, as, for example by being welded thereto.

In FIGS. 6–8 there is shown an auxiliary guide means 19 together with the main guide mean 10, and it will be noted from FIG. 7 that the parts are shown when a vehicle wheel 23 is raised from the rail. It is possible during travel along the rails for a vehicle wheel to become raised therefrom, as for example, when the vehicle executes a turn at a relatively high speed or when it encounters obstructions resulting in bumping of the vehicle along the rails. The auxiliary guide mean 19 is also connected in this case to the pins 20 which cooperate with the main guide means 10 in the manner described above in connection with FIGS. 4 and 5. However, in the embodiment of FIGS. 6–8 a rail-engaging means 25 is provided. This rail-engaging means has a lower face adapted to directly engage and ride on the upper surface of the rail and it also has upwardly curved front and rear ends. An upper wall of the rail-engaging means 25 is fixed to its upwardly directed front and rear ends and has lateral extensions fixed to the pins 20, and in addition it is to be noted that the element 16 which is fixed to the guide 10 to limit downward movement of the vehicle is formed with a bore receiving a guide pin 24 fixed to the rail-engaging means 25 so that by engaging the rail the means 25 determines the elevation of the auxiliary guide means 19, and in this case as the vehicle moves up and down due to springing or the like or due to movement of a wheel away from the rail, as shown in FIG. 7, the guide member 10 will move with the vehicle while the rail-engaging means 25 will maintain the auxiliary guide 19 at a constant elevation relative to the rail so that the auxiliary guide member 19 always extends through the same distance $t$ downwardly from the elevation of the top surface of the rail. The slide plate 25 remains in engagement with the rail due to its own weight and the weight of the auxiliary guide member 19. Thus, with this construction if the guide member 10 should move upwardly the rail-engaging means 25 will remain in engagement with the rail to prevent upward movement of the auxiliary guide member 19.

The embodiment of FIGS. 9–11 is similar to and will achieve the same results as the embodiment of FIGS. 6–8. In FIGS. 9–11 the main guide member 10 is formed in its left side face, as viewed in FIG. 10, with a recess receiving the auxiliary member 19 which in this case is fixed by pins 26, which extend through vertical slots of the main guide member 10, to the rail-engaging means 25 which in this embodiment carries rollers 27 which ride on the upper surface of the rail, so that the friction reducing means 27 reduces the friction between the rail-engaging means and the rail while at the same time the auxiliary guide member 19 will be maintained at a constant elevation relative to the rail providing the distance $t$ between the top face of the rail and the bottom edge of the auxiliary guide 19. In the embodiments of FIGS. 6–11 the member 16 fixed to each guide member 10 will engage the top surface of the plate 25 to limit the downward movement of the vehicle. Also, while the slide plate 25 can reliably remain in engagement with the rail due to its own weight and that of the auxiliary guide 19, a spring means can be provided to urge the elements 25 downwardly.

In some vehicles it is difficult to connect the plurality of guide means 10 to the structure which support the wheels of the vehicle, and therefore with such vehicles it is possible, in accordance with the invention, to connect the several guide means 10 to the vehicle body, but in this case the springy support for the vehicle body is rendered ineffective, also in accordance with the invention.

FIG. 12 shows how screw members 28 can be threaded to the vehicle axle assemblies 29 and can be adjusted to press linkages referred to below against springs 31 situated between these linkages and the vehicle body 30 so that in this way the leaf spring assemblies or other springs means which supports the vehicle body on the axles can be rendered ineffective while the vehicle travels on rails.

In FIG. 13, it is shown that instead of using threaded spindles 28 it is possible to use movable cylinders 32 mounted on the vehicle axle and housing in their interiors pistons whose piston rods press the linkages against the springs 31 situated between these linkages and the vehicle body. The assemblies 32 can be controlled either hydraulically or pneumatically, and the adjustment of the spindles or pistons can be brought about through suitable transmissions or conduits for fluid under pressure either directly or from the driver's seat.

FIG. 14 shows in a side view the structure of FIG. 13, although it is to be understood that the threaded spindle 28 could be substituted in FIG. 14 for the fluid-pressure assemblies 32. As may be seen from FIG. 14, the springs 31 may take the form of rubber blocks which in accordance with the invention have the same spring characteristics as the rubber tires 37. The linkages 33 are pivoted at 35 to the vehicle body 30 for turning movement about an axis which extends transversely of the vehicle, and the other ends of the links 33 are pivoted to assemblies 34 which are guided for substantially vertical movement relative to the vehicle body 30, and these assemblies 34 respectively carry the several guides 10. Because the hydraulic or pneumatic means 32 presses the linkage 33 against the spring means 31, the normal spring means of the vehicle is rendered ineffective. As the vehicle is provided with an increasing load the tires 37 therefore will, of course, yield so that the vehicle tends to move downwardly towards the rails and on the other hand, when the load on the vehicle is reduced the tires will expand to tend to raise the vehicle. However, because the springs 31 have the same characteristics as the springiness of the tires 37 the load will be transmitted through the linkages 33 to the springs 31 to compress the latter to substantially the same extent that the tires yield during an increase in load or to permit the springs 31 to expand to the same extent as the tires 37 during a reduction in load with the result that while the vehicle body moves up and down during load changes the guide means 10 is maintained at a substantially constant elevation with respect to the rail providing proper guiding and maintenance of wheels 37 on the rails even during load changes. The structure is shown in FIG. 14, in a condition of maximum load. As the load lightens the body 30 will move upwardly relative to guide means 10 which remains at the same elevation.

When the vehicle of the invention is to travel on a street, it is a simple matter to remove the guides 10 by hand, because of the light weight of the guides 10, although it is also possible to provide a hydraulic or mechanical structure for raising the guides 10 so that they cannot engage the street. In the case of FIGS. 1–3, the bolts 9 can be removed so that the arms 8 together with the guides 10 fixed thereto can simply be slipped off the ends of the springs 7 when the vehicle is to travel on a street.

It will be understood that each of the elements described above, or two or more together, may also find a useful application on other types of vehicles differing from the types described above.

While the invention has been illustrated and described as embodied in rail or street vehicles it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a vehicle adapted to travel on streets and railways, in combination, a vehicle body; two pairs of wheels respectively situated at opposite sides of said vehicle body to support the latter for travel on streets, said wheels being spaced from each other by a distance equal to the distance between rails of a railway so that said wheels can also ride on railway rails; main guide means carried by said vehicle body and having operative position adjacent said wheels and in the immediate vicinity of railway rails in the space normally occupied by rims of conventional rail wheels to cooperate with rails for guiding and maintaining said vehicle wheels thereon, said main guide means being displaceable away from said operative positions thereof to locations where said main guide means will have no influence on normal travel of the vehicle on streets; and auxiliary guide means carried by said main guide means for vertical movement relative thereto and extending downwardly beyond said main guide means to an elevation lower than the top surface of rails on which said wheels travel.

2. In a vehicle adapted to travel on streets and railways, in combination, a vehicle body; two pairs of wheels respectively situated at opposite sides of the vehicle body for supporting the latter for travel on streets, said pairs of wheels being spaced from each other by a distance equal to the distance between railway rails so that said pairs of wheels can also ride on railway rails; frame means carried by said vehicle body; a plurality of main guide means carried by said frame means in an operative position respectively adjacent said vehicle wheels and respectively located in close proximity to railway rails during travel of said vehicle wheels thereon for guiding and maintaining said vehicle wheels on said rails; a plurality of auxiliary guide means operatively connected to said main guide means for vertical movement relative thereto and extending downwardly beyond said guide means to an elevation lower than the top surface of rails on which said vehicle wheels ride; and rail-engaging means operatively connected to said auxiliary guide means and engaging the rails for maintaining said auxiliary guide means at a substantially constant elevation relative to said rails irrespective of variations in elevation of said guide means and vehicle wheels relative to said rails during travel of said vehicle wheels thereon, said main guide means being displaceable away from said operating position together with said auxiliary guide means and said rail engaging means so as not to interfere with travel of said vehicle on streets.

3. In a vehicle as recited in claim 2, said rail-engaging means being connected to said main guide means for free vertical movement relative thereto and directly supporting said auxiliary guide means.

4. In a vehicle adapted to travel on streets and railways, in combination, a vehicle body; two pairs of rubber-tired wheels respectively situated at opposite sides of the vehicle body to support the latter for travel on streets, said pairs of wheels being spaced from each other by a distance equal to the distance between railway rails so that said wheels can also ride on railway rails; a plurality of guide means respectively located in an operative position in the regions of said wheels for cooperating with railway rails to guide and maintain said wheels thereon, said guide means being displaceable from said operative position thereof to locations where said guide means will have no influence on normal travel of the vehicle on streets, said spring means cooperating with said guide means for maintaining the elevation of the latter constant relative to said rails irrespective of changes in the elevation of the vehicle body due to load changes; a plurality of linkage means respectively connected operatively to said plurality of guide means and to said vehicle body for changing the elevation of said plurality of guide means relative to said vehicle body; a plurality of spring means of substantially the same spring characteristics as the tires of said vehicle wheels respectively situated between said plurality of linkage means and said vehicle body; and means urging said plurality of linkage means toward said vehicle body to compress said plurality of spring means between said plurality of linkage means and said vehicle body, said plurality of spring means yielding during loading and unloading of the vehicle substantially to the same extent as the tires of said vehicle wheels for maintaining through said plurality of linkage means the elevations of said plurality of guide means substantially constant relative to the railway rails irrespective of changes in the elevation of the vehicle body due to load changes.

References Cited by the Examiner
UNITED STATES PATENTS

| | | | |
|---|---|---|---|
| 734,609 | 7/1903 | Porter | 104—245 |
| 1,490,781 | 4/1924 | Marshall | 105—216 |
| 1,716,005 | 6/1929 | Ridley | 105—215 |
| 1,938,049 | 12/1933 | Serrano | 105—215 |
| 2,062,801 | 12/1936 | Talon | 105—215 |
| 2,078,397 | 4/1937 | Main et al. | 105—215 |
| 2,116,786 | 5/1938 | Gross | 105—215 |
| 2,140,421 | 12/1938 | Fageol | 105—215 |
| 2,986,102 | 5/1961 | Cox | 105—215 |
| 3,244,118 | 4/1966 | Lich | 105—215 |

ARTHUR L. LA POINT, *Primary Examiner.*

F. W. MONAGHAN, D. E. HOFFMAN,
*Assistant Examiners.*